United States Patent
Ward et al.

[19]

[11] Patent Number: 6,164,461
[45] Date of Patent: *Dec. 26, 2000

[54] STORAGE RACK

[75] Inventors: Eric A. Ward, Telford; Bill G. Neal, Chuckey, both of Tenn.

[73] Assignee: Meco Corporation, Greeneville, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/245,833

[22] Filed: Feb. 5, 1998

[51] Int. Cl.$^7$ ...................................................... A47F 5/00
[52] U.S. Cl. .............................. 211/41.1; 211/40; 211/50; D6/513
[58] Field of Search ............................ 211/40, 50, 41.12, 211/41.1, 11

[56] References Cited

U.S. PATENT DOCUMENTS

| | | | |
|---|---|---|---|
| D. 170,798 | 11/1953 | Dundon et al. | D58/13 |
| D. 179,485 | 1/1957 | Laughlin | 278/96.2 |
| D. 186,672 | 11/1959 | Gilruth | D33/2 |
| 238,117 | 2/1881 | Hillman | 211/11 |
| D. 243,042 | 1/1977 | Dorn | D6/3 |
| D. 275,536 | 9/1984 | Sandy | D6/473 |
| D. 296,280 | 6/1988 | Malecki | D6/474 |
| D. 356,454 | 3/1995 | Harris | D6/396 |
| D. 374,582 | 10/1996 | Chu | D6/513 |
| D. 387,840 | 12/1997 | Duggan | D6/407 |
| 600,879 | 3/1898 | Louden | 211/11 X |
| 801,149 | 10/1905 | Meaker | 211/49.1 X |
| 1,470,159 | 10/1923 | Gibson | 211/55 X |
| 1,659,509 | 2/1928 | Ashbrook | 211/11 |
| 1,699,025 | 1/1929 | Schulz | 211/55 X |
| 1,917,005 | 7/1933 | Anderson et al. | 211/55 X |
| 2,019,371 | 10/1935 | Tompkins | 40/124 |
| 2,249,265 | 7/1941 | Bauder | 129/15 |
| 2,345,228 | 3/1944 | Babineau | 129/43 |
| 2,487,302 | 11/1949 | Bradley | 129/16 |
| 2,523,908 | 9/1950 | Johsen | 95/100 |
| 2,751,088 | 6/1956 | Hargett | 211/55 |
| 2,769,550 | 11/1956 | Rollins et al. | 211/11 |
| 3,559,866 | 2/1971 | Olson, Sr. | 229/14 |
| 4,484,538 | 11/1984 | Sarkozy et al. | 211/40 X |
| 4,684,027 | 8/1987 | Wright | 211/40 |
| 4,765,469 | 8/1988 | Seifert | 211/40 X |
| 4,796,761 | 1/1989 | Hermelin | 211/11 |
| 4,811,851 | 3/1989 | Shane | 211/41 |
| 4,944,412 | 7/1990 | Daigre | 211/11 |
| 5,411,145 | 5/1995 | Parks | 211/50 |
| 5,810,182 | 9/1998 | Levin | 211/195 |
| 5,884,783 | 3/1999 | Prouxl | 211/85.4 |

*Primary Examiner*—Alvin Chin-Shue
*Assistant Examiner*—Khoa Tran
*Attorney, Agent, or Firm*—Roberts Abokhair & Mardula, LLC

[57] ABSTRACT

A one-piece storage rack is made in a single piece construction. The storage rack comprises an elongated bed having at least four generally flat sides forming at least two troughs, one apex and two outermost sides that are upwardly divergent. The rack is made in a single-piece construction from either sheet metal or plastics. According to one embodiment, the storage rack is specifically designed for the storage and organization of compact discs and other similar flat material.

23 Claims, 2 Drawing Sheets

STORAGE RACK

BACKGROUND OF THE INVENTION

The present invention relates generally to a portable storage rack, more particularly to a one piece organizer rack, which may be placed on a table, shelf or other level surface and which is stack able, for holding articles such as compact discs and books. Offices, homes, apartments, student dormitories, and other areas with minimum available space require inexpensive but durable storage to accommodate the current proliferation of compact discs for both music and computer programs as well as to accommodate books and other articles.

Various items are available on the market and/or known in the art for the storage of compact discs and similar articles. Various systems employ multi-part articles that can be expanded or built upon through various means of connections. These articles utilize a single angled unit and require the utilization of at least two units connected together in order to provide stability. Other articles are limited to a single unit with various means for stabilization. The various means of stabilization are necessary to allow the single unit to stand alone on a bookshelf or flat surface. Other articles include horizontal or vertical storage devices with individual slots for storing a plurality of compact discs or similar material. These articles include the complications of requiring either means to connect single units together or means to provide stability for a stand alone unit. This requires more sophistication in manufacturing and additional material in the manufacture of the article.

Accordingly, there is a need for an inexpensive, durable, rigid storage article for these items. The article or storage rack should be easily manufactured in order to keep costs low and should be constructed of a material of sufficient strength, durability, and rigidity to resist breakage and deformation during shipping, storage, and use. Further, to conserve shipping space during transport and to conserve storage space in wholesale and/or retail outlets, it is desirable that the medium be stackable, minimizing volume needs. There is also a need to be able to read the individual titles of the items stored in the medium and to remove any one or more of the items in the stack without the necessity of removing the entire stack from the storage medium. In addition, the medium should be stable to prevent tipping which can result in breakage or deformation of stored items, particularly such items as compact discs.

SUMMARY OF THE INVENTION

Accordingly, it is an objective of the present invention to provide for a portable one piece storage rack for holding articles such as compact discs and books.

It is a further objective of the present invention to provide for a portable one piece storage rack for holding articles such as compact discs and books which is easily and inexpensively manufactured from a single piece of rigid material such as plastics, steel, or other material of similar strength, durability, and rigidity.

It is a further objective of the present invention to provide for a portable one piece storage rack for holding articles which is easily stack able thereby resulting in savings in both money and space due to minimal space requirements for shipping, warehousing and storage.

It is a further objective of the present invention to provide for a novel and improved portable one piece storage rack for holding articles which can stack a maximum number of articles in staggered relation within a limited space and enable ease of removal of one or more articles without removal of the other stored articles.

It is a further objective of the present invention to provide for a novel and improved portable one piece storage rack for organizing and supporting articles such as compact discs and books which is lightweight, of simple construction, and occupies a minimum of space.

It is a further objective of the present invention to provide for a novel and improved portable one piece storage rack of open ended construction which facilitates ready identification of articles stored therein as well as insertion and removal of articles such as compact discs and books in a convenient location.

It is a further objective of the present invention to provide for a stable storage medium so as to prevent tipping and breakage or deformation of stored items.

The present invention is a portable one piece storage rack which may be placed on a table, shelf, or other level surface, and which is stackable, for holding articles such as compact discs and books. The invention consists of a single piece of rigid material such as plastics, steel, or other material of similar strength, durability, and rigidity.

In one embodiment of the present invention, the storage rack comprises an elongated bed having at least four generally flat sides forming at least two troughs, one apex and two outermost sides that are upwardly divergent. The rack is made in a single-piece construction. This can be accomplished in a plastics molding process or a metal stamping process. In yet another embodiment of the present invention, the storage rack is specifically designed for the storage and organization of compact discs and other similar flat material. The rack comprises an elongated bed having at least six sides forming at least three troughs, two apexes, and two outermost sides that are upwardly divergent. The alternate sides are parallel and the rack is made in a single-piece construction.

In another embodiment, the storage article is formed into a series of three troughs and two apexes, with each wall being of equal length and being approximately perpendicular to its immediately adjoining wall. Other embodiments include additional walls with a corresponding increase in troughs and apexes. Other embodiments have walls which are of varying lengths and/or which form acute angles or obtuse angles, in varying combinations, with adjacent and adjoining walls.

These and other features, aspects, and advantages of the present invention will become better understood with reference to the following drawings, description, and appended claims.

DESCRIPTION OF THE INVENTION

Accordingly, the present invention provides a rack for the storage, display, and organization of articles such as books, compact discs, and other small objects. The storage rack has at least four sides that are at an angle to each other. In a preferred embodiment, the article of the present invention has at least six sides. The article of the present invention can be made out of any rigid material. For example, the article can be molded or theretofore from plastics. Suitable plastics include polyolefins, styrenic, and the like. Additionally, the article of the present invention can be made out of metal and preferably out of sheet metal. For example, the metal may be formed or stamped from a larger metal sheet. The sheet can be sized to the proper width before or after stamping. The sheet metal may be coated or painted in order to improve the aesthetics and/or reduce potential abrasion of the surface where the storage article is utilized.

Figure 3:
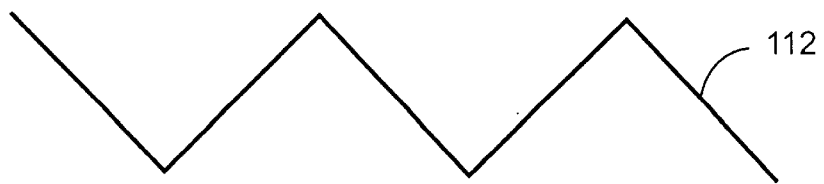
FIG. 3 depicts an alternate embodiment of the invention having an odd number of sides.

Each side of the article forms an angle to the adjacent side such that a minimum of two troughs and one apex are formed. Additionally, the outermost sides are preferably but not necessarily upwardly divergent. Adding a downwardly divergent side 112 at the end would result in the utilization of additional raw material without adding any storage space. However, these additional sides 112 may be added for stability or aesthetic purposes, as shown in FIG. 3. It is preferred that the trough angles are equal to or greater than forty-five degrees but equal to or less than 135 degrees. In the most preferred embodiment, the trough angle is around ninety degrees. An advantage of utilizing a trough angle that is different than ninety degrees is that it allows the staggering of similarly sized articles for improved identification and retrieval from the stack.

Figure 2:
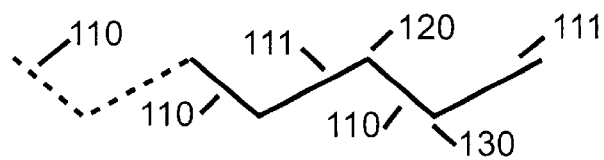
FIG. 2 depicts various embodiments showing variations in shape, size and angles.
Figure 2:
Figure 2:
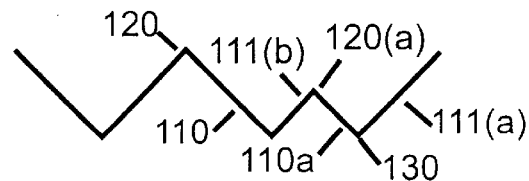
Figure 2:
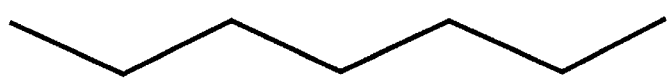
Figure 2:
Figure 2:
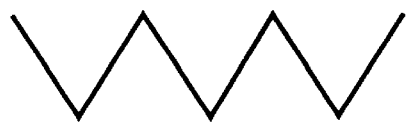

In a most preferred embodiment, all of the sides are of equal size. However, variation in the length of the sides can be easily achieved. The size variation does not add significantly to the difficulty of formation in a one piece construction. It is also preferred that alternate sides are parallel to each other. However, this is not necessary in the application of the present invention. Various combinations of trough and apex angles and side sizes are contemplated. Some examples are shown in FIG. 2.

Figure 1:
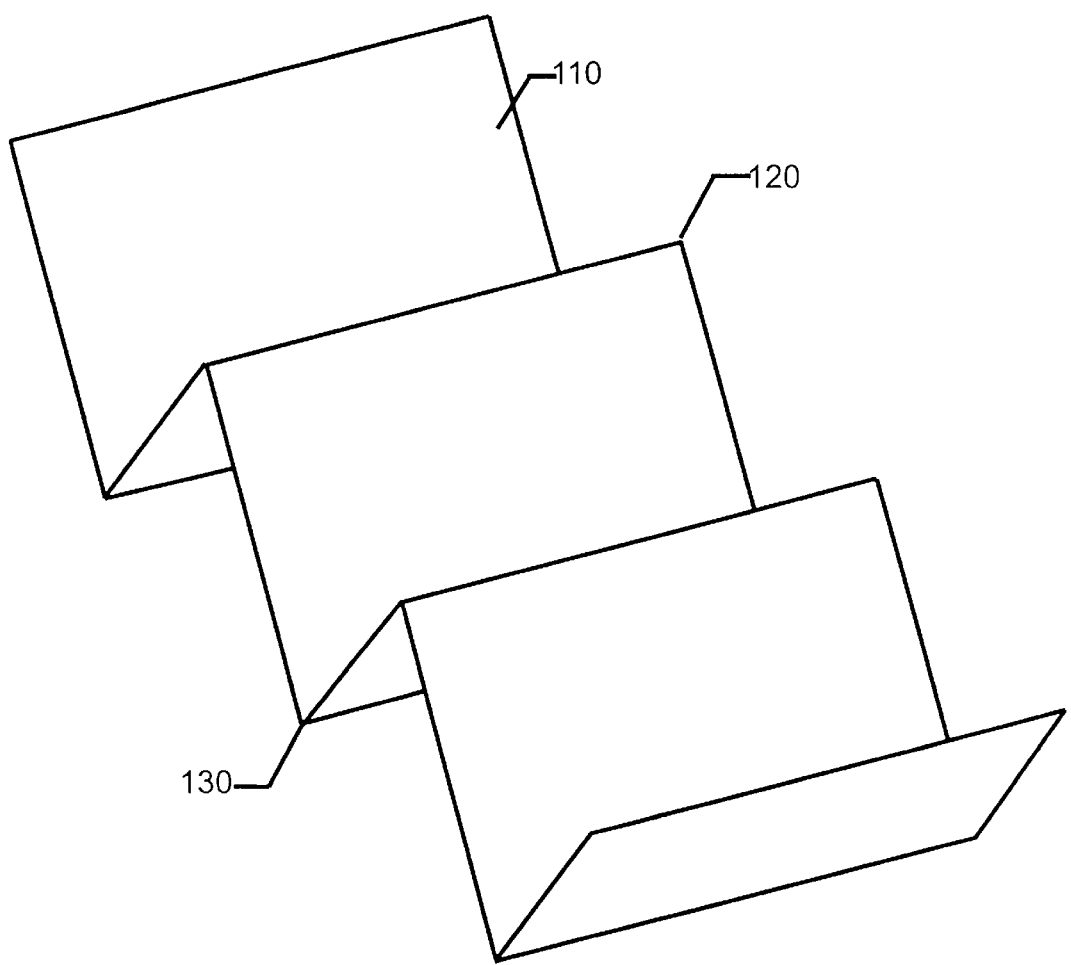
FIG. 1 is a perspective view of a preferred embodiment of the storage rack in accordance with the present invention.

In one embodiment of the invention as shown in FIG. 1, the storage rack is comprised of a single piece of steel, or other material of similar strength, durability, and rigidity which is formed into a series of three troughs 130 and two apexes 120 with each of the six walls 110 being of approximately equal length and being approximately perpendicular to its immediately adjacent and adjoining wall 110. Each of the outermost walls at each end of the invention diverges upwardly at approximately a forty-five degree angle relative to the horizontal surface. The invention may also be inverted, as needed or as required by the user, to form two troughs 130 and three apexes 120 with each of the outermost walls 110 at each end pointing downward at approximately a forty-five degree angle. Adding a side at either end renders the storage rack usable on both sides.

The invention is lightweight, portable, and is of a simple, single piece construction which has no additional parts thereby reducing the likelihood of breakage or deformation. This also reduces the complexity of manufacturing and the manufacturing costs of the storage rack. The invention may be stamped, molded, pressed, blown, or otherwise fashioned through other manufacturing techniques known in the art.

Some articles to be stored in a storage rack of the present invention, such as compact discs and/or books, have a front and a back side, each of approximately equal dimensions to the other but not necessarily having all sides of equal dimensions, joined together along at least one of four common edges with the four edges being defined as a top edge, a bottom edge, and two side edges. The storage area of the present invention consists of the troughs 130 with either of the two walls 110 forming the same trough 130 being used to support the items being stored in the storage rack.

The articles to be stored in the invention are commonly placed in the trough 130 with the front or back of the article to be stored being supported by either one of the adjacent and adjoining walls 110 which forms the trough 130 and one of the four edges of the article, most commonly the bottom edge to allow for ease of viewing the title of the article(s) being stored, being supported by the opposite wall 110. The article(s) to be stored may be supported on either the front or back of the article and along any of the four sides as the user may desire or may require for his or her particular application. The articles to be stored may be supported on the front or back side of the article along either of the adjacent and adjoining walls 110 forming the same trough 130 as desired by the user or as required for his or her particular application thereby allowing the user a variety of applications. The troughs 130 are open at either end thus allowing a variety of articles of differing sizes to be stored in the troughs 130 as well as allowing ease of stacking. Multiple storage racks are placed together with the troughs 130 of one copy mating with the troughs 130 of adjacent copies and the apexes 120 of one copy mating with the apexes 120 of adjacent copies. The stacking capacity reduces storage space for both the customer and the merchant and minimizes shipping and storage space and associated costs.

Articles to be stored in a storage rack of the present invention may be stacked with the front or back of one article contacting either one of the adjacent and adjoining walls 110 forming a trough 130 or contacting the front or back of the immediately adjacent article located in the same trough 130. The user can readily identify stored articles and can insert or remove one or more of the stored articles without disturbing the other articles.

Whether the end walls 110 are facing upward or downward, the unique construction of the invention allows the invention to rest on either the troughs 130, when the end walls 110 are facing upward, or on the troughs 130 and the end walls 110 when the end walls 110 are facing downward, thus providing for a stable storage medium in order to prevent tipping of the invention with breakage or deformation of stored items. When the end walls 110 are facing upward and the articles to be stored are supported by either of the outer walls 110 forming the outermost troughs 130, the invention becomes increasingly stable as additional articles are placed therein due to the center of gravity shifting toward the center of the trough 130.

In other embodiments of the invention, the number of troughs 130 and apexes 120 may be more or less than that of the preferred embodiment. Also, in other embodiments, angles of the walls 110 forming the troughs 130 and apexes 120 of the invention may be right angles, acute angles, obtuse angles, or various combinations of these angles.

FIG. 2 shows some of the possible variations in the construction of a storage rack in accordance with the present invention. FIG. 2(a) shows a four sided or a six sided storage rack wherein the sides 110 are shorter than the sides 111. Additionally, the angle at the trough 130 is greater than ninety degrees. Sides 111 and sides 110 are respectively parallel to each other.

FIG. 2(b) shows one embodiment of the present invention wherein a four or six sided storage rack is utilized. The sides are of equal length and connected to each other at approximately ninety degree angles.

FIG. 2(c) graphically depicts another embodiment of the present invention. While all of the alternate sides are parallel to each other, the sides are not of equal length. Sides 110a and 111b are shorter than sides 111a and 110. Apex 120a between sides 110a and 111b is lower than apex 120. The sides are at approximately ninety degree angles relative to each other.

FIG. 2(d) shows another embodiment of the present invention where the angles of the sides relative to each other are greater than ninety degrees. FIG. 2(e) shows another embodiment of the present invention wherein the sides are at approximately ninety degree angles relative to each other. However, in this embodiment, the sides are not of equal length.

FIG. 2(f) shows another embodiment of the present invention wherein the sides are at less than ninety degree angles relative to each other.

A unique feature of the present invention is the absence of any protrusions or extraneous material on the surface of the rack. As noted, for ease of manufacture and other purposes, the surface of the rack is relatively smooth without any need to include attaching means or other stabilizing means. When made from plastic material, this allows for an easy construction of a mold and ease of molding process. In a metal application, this allows a simple stamping of a metallic sheet.

In accordance with the present invention, it is contemplated that the storage racks are painted or coated to provide different colors and different textures on the surface.

Other embodiments, with modifications and changes to the preferred embodiment, do not depart from the scope and spirit of the invention as defined by the claims appended hereto.

What is claimed is:

1. A storage rack consisting essentially of:
   an elongated bed having:
      at least four generally flat sides alternating upwardly and downwardly and disposed adjacent one another to form at least two troughs having opposing open trough ends,
      an apex connecting each pair of adjacent troughs, and
      a first end with an upwardly extending outermost side and a second end with an opposing outermost trough side that are upwardly divergent, wherein the rack is made in a single piece construction and self-supported by the at least two troughs, and wherein at least one of the troughs is so dimensioned as to be capable of supporting a compact disc within the at least one trough.

2. The storage rack of claim 1 having at least six sides forming at least three troughs.

3. The storage rack of claim 1 wherein the flat sides are of unequal length.

4. The storage rack of claim 1 the troughs are formed at an angle of from 45 degrees to 135 degrees.

5. The storage rack of claim 1 wherein each side is a square of about five inches each side.

6. The storage rack of claim 1 formed by injection molding of thermoplastic material.

7. The storage rack of claim 1 formed from a rigid sheet of metal.

8. The storage rack of claim 1 formed from a stamped and coated metal sheet.

9. The storage rack of claim 1 wherein at least one of the troughs is so dimensioned as to be capable of supporting a book within the at least one trough.

10. The storage rack of claim 1, wherein the opposing outermost trough side is an outermost side at the second end.

11. The storage rack of claim 1, wherein the opposing outermost trough side is adjacent to a downwardly extending outermost side at the second end.

12. A compact disc storage rack consisting essentially of:
   an elongated bed having:
      at least six sides alternating upwardly and downwardly and disposed adjacent one another to form at least three troughs with opposing open trough ends,
      an apex connecting each pair of adjacent troughs, and
      a first end with an upwardly extending outermost side and a second end with an opposing outermost trough side that are upwardly divergent, wherein alternate sides are parallel, wherein the rack is made in a single piece construction and wherein at least one of the troughs is so dimensioned as to be capable of supporting a compact disc within the at least one trough.

13. The storage rack of claim 12 wherein the flat sides are of unequal length.

14. The storage rack of claim 12 the troughs are formed at an angle of from about 45 degrees to about 135 degrees.

15. The storage rack of claim 12 wherein each sides is a square of about five inches each side.

16. The storage rack of claim 12 formed by injection molding of thermoplastic material.

17. The storage rack of claim 12 formed from a rigid sheet of metal.

18. The storage rack of claim 12 formed from a stamped and coated metal sheet.

19. The compact disc storage rack of claim 12, wherein the opposing outermost trough side is an outermost side at the second end.

20. The compact disc storage rack of claim 12, wherein the opposing outermost trough side is adjacent to a downwardly extending outermost side at the second end.

21. A compact disc storage rack consisting essentially of:
   an elongated bed having:
      at least six generally flat and equal sides alternating upwardly and downwardly and disposed adjacent one another to form at least three troughs with opposing open trough ends,
      an apex connecting each pair of adjacent troughs, and
      a first end with an upwardly extending outermost side and a second end with an opposing outermost trough side that are upwardly divergent, wherein each side is at about a right angle to any adjacent side, wherein the rack is made in a single piece construction and wherein at least one of the troughs is so dimensioned as to be capable of supporting a compact disc within the at least one trough.

22. The compact disc storage rack of claim 21, wherein the opposing outermost trough side is an outermost side at the second end.

23. The compact disc storage rack of claim 21, wherein the opposing outermost trough side is adjacent to a downwardly extending outermost side at the second end.

* * * * *